June 16, 1959 J. C. HOLMES 2,891,154

PULSE DEMODULATOR

Filed Nov. 30, 1956 3 Sheets-Sheet 1

INVENTOR
JULIAN C. HOLMES

BY W R Mattox
Richard E Reed
ATTORNEYS

INVENTOR
JULIAN C. HOLMES

BY W.R. Maltby
Richard Reed
ATTORNEYS

INVENTOR
JULIAN C. HOLMES

BY W R Maltby
Richard C Reed

ATTORNEYS

United States Patent Office 2,891,154
Patented June 16, 1959

2,891,154

PULSE DEMODULATOR

Julian C. Holmes, Washington, D.C., assignor to the United States of America as represented by the Secretary of the Navy Application November 30, 1956, Serial No. 625,561

5 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

This invention relates in general to electrical impulse intelligence communication systems and in particular to apparatus for converting pulse-time variations into amplitude variations.

Although considerable work has been done in the field of pulse communications wherein intelligence is contained as position-time variations of pulses in a wavetrain, considerable difficulty has been encountered in the conversion of the pulse position-time variations into more readily used amplitude-time variations. Conversion circuits almost invariably employ some form of time-constant or integrating circuit which is inherently limited as to the range of pulse position-time variations over which reasonably accurate conversion can occur. Wide range operation of such systems normally require manual selection or switching of various time-constant circuits and other circuit parameters to achieve satisfactory results. Although such manipulations can produce desirable results there are many instances where it is necessary to have a wide range converter unit capable of handling all forms of pulse-time variations without requiring complex switching or any significant amount of attention from an operator.

It is accordingly an object of the present invention to provide an improved converter for changing a pulse position-time modulation into amplitude modulation.

In accordance with the teachings of the present invention an improved converter is provided for changing a pulse position-time modulated electrical signal into an amplitude modulated signal wherein a recurrent sawtooth waveform is generated having a peak amplitude dependent upon the position-time variation of pulses, it being understood that the term position-time variation as herein used is intended to include the usual forms of pulse modulation, such as recurrence frequency, pulse width, pulse spacing or combinations of such forms. Proportionality of sawtooth amplitude relative to the pulse modulation is maintained over an extremely wide range of modulation variation by the incorporation of automatically operating compensating circuitry. Additional compensation circuitry provides flexibility and simplicity in switching from one form of modulation to another and extremely rapid self-adjustment in the face of signal discontinuities which are even so great as to amount to changes of sources.

Figures 1, 4:
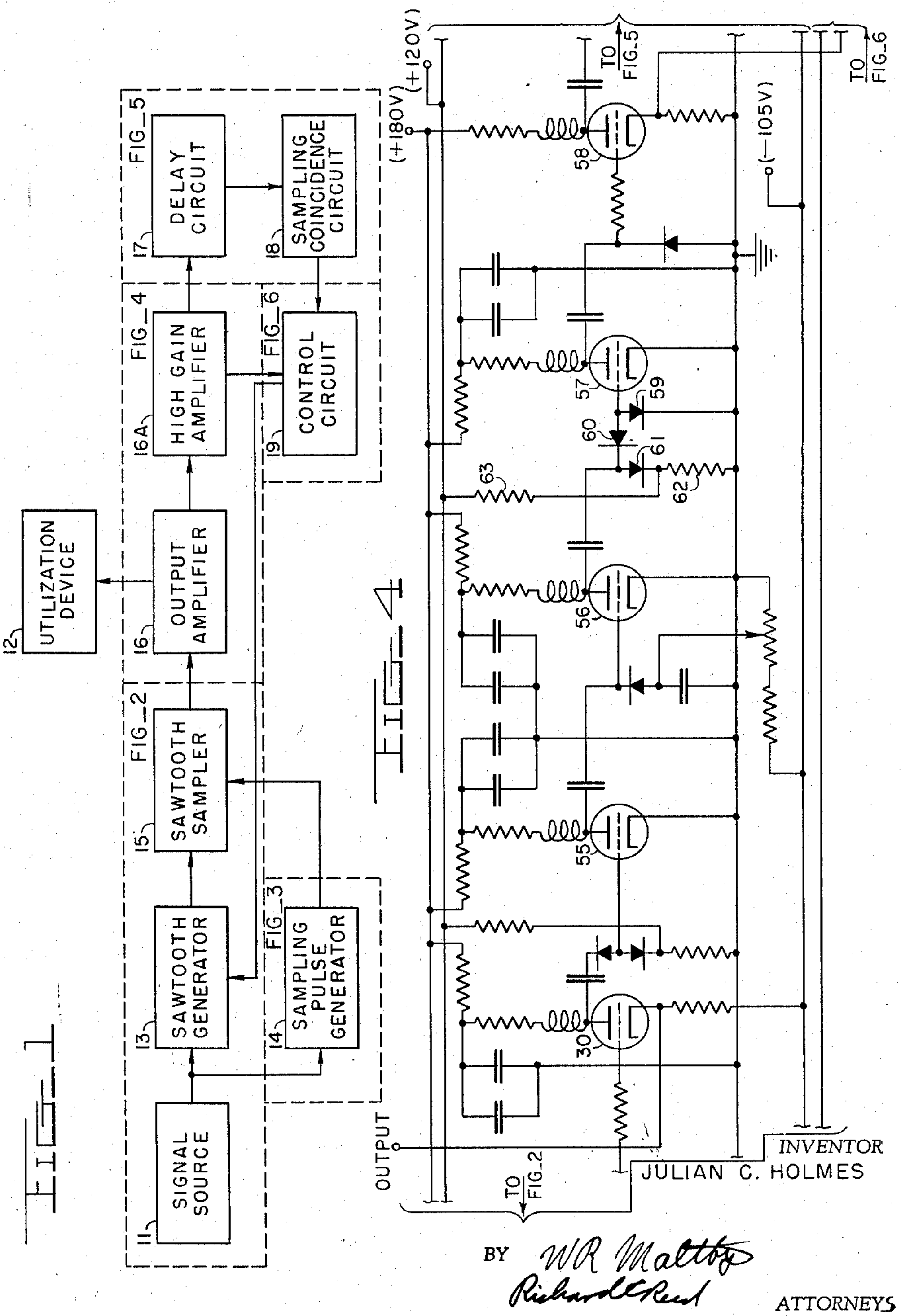

With particular reference now to the block diagram of Fig. 1, the apparatus of the present invention is shown as intermediate equipment between a signal source 11 and a utilization device 12. Signal source 11 is of suitable nature to provide signals having the variational characteristics previously described and typically may take the form of a local signal generator device, or of a wired or wireless link to some distant signal source. The utilization device 12 may be any suitable apparatus capable of making desired use of signals from signal source 11 after conversion. Typically the utilization device may include some form of storage device or a visual or audible signal presentation device such as a cathode ray tube indicator or a loudspeaker.

Signal source 11 is connected to sawtooth generator 13 and to a sampling pulse generator 14. Sawtooth generator 13 in turn is connected through sawtooth sampler 15 and output amplifier 16 to the utilization device 12 under the control of the sampling pulse generator 14. Control of the response of the sawtooth generator 13 to signals from signal source 11 is maintained by a control loop consisting of amplifier 16–A, delay circuit 17, sampling coincidence circuit 18 and a control circuit 19. This control loop provides for automatic compensation of the sawtooth generator operation to permit satisfactory operation over very wide ranges of average input pulse recurrence rate and modulation form and to provide considerable noise immunity.

Position-time modulated impulses from signal source 11 are applied to the sawtooth generator 13 wherein each pulse causes the charging of an energy storage device to a selected energy level. At the conclusion of each pulse, a discharge of the energy storage device begins at a controlled rate which continues until a succeeding pulse occurs to produce recharging of the storage device. Typically, where the applied pulses are period modulated, of positive polarity, and the energy storage device is a capacitance, negative going sawtooth signals will be produced having amplitude dependency on the spacing between adjacent input pulses.

Such variable amplitude sawtooth signals are not of a form readily usable by simple integrator circuits because of the simultaneous variable duration characteristic. The sawtooth sampler circuit 15 corrects this situation by producing an output pulse of fixed duration and of an amplitude equal to that of the peak of the sawtooth signals. The sampler circuit 15 is controlled by the sampling pulse generator 14 which is timed from the input signals to provide sampling pulses at the appropriate time to produce sampling by sampler circuit 15 of the peak amplitude of each generated sawtooth signal. Typically the timing is such as to produce sampling at the instant of maximum amplitude of each sawtooth signal corresponding to the end of each input pulse. Although the timing of the sampling pulse is such as to produce sampling at an instant in time following each charge of capacitance 24, the damper tube 31 effectively resets the potential across capacitance 29 at the conclusion of the discharge cycle of capacitance 24 so that sampling of the potential at the anode of tube 32 at that time can accurately measure the peak amplitude of the preceding sawtooth cycle.

The basic circuitry thus far operationally described is capable of operation without significant distortion over a rather limited range of variation of the average frequency of the input pulse signals. Since wide frequency adaptability of operation is a primary objective of the present invention, it has been found that additional circuitry will increase the operating frequency range of the equipment. This additional circuitry including the previously designated control loop, provides automatic variation of the charging rate of the sawtooth generator 13 so that an optimum charging rate is maintained over a wide range variation in the average frequency of input pulses.

The control loop is made responsive to the amplitude of the generated sawtooth signals after they have been sampled by the sawtooth sampler. Basically the amplitude of the generated sawtooth signals is dependent upon the magnitude of the discharge resistance. Increases in input frequency reduce the time available for the discharge of the condenser and hence reduce the amplitude of the generated sawtooth signal. Changes of this nature do not materially affect the linearity of the generated sawtooth signal but they do reduce the amplitude thereof. On the other hand decreases in input frequency increase the discharging time so that a larger amplitude sawtooth signal is produced. If the amplitude increases to such an extent as to exceed the linear operating limits of the circuits, the linearity of the generated sawtooth signal deteriorates until the peak amplitude loses proportionality to pulse spacing, introducing distortion. The control loop corrects this situation automatically by adjusting the time constant of the sawtooth generator circuit to maintain the peak amplitude of the generated sawtooth signal within proper limits. The control loop comprises amplifiers 16 and 16–A connected to the output of the sawtooth sampler 15 and a control circuit 19 connected to the sawtooth generator 13. The control circuit 19 is further stabilized by an additional loop comprising delay circuit 17 and a sampling coincidence circuit 10, the operations of which will be described in detail at a later point in the specification.

Figures 2, 3:
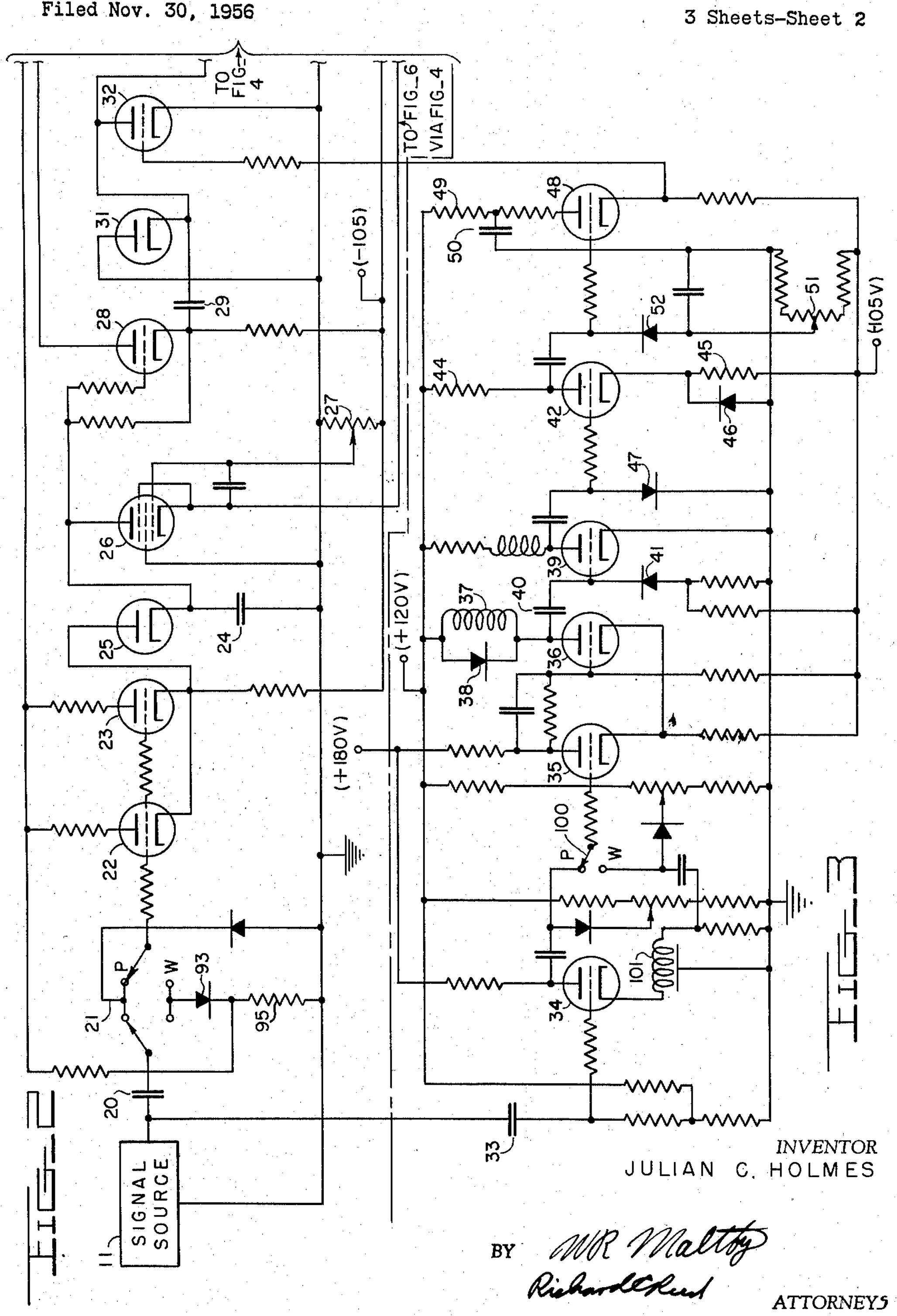

The sawtooth generator 13 and the sawtooth sampler 15 are typified in Fig. 2 of the drawing wherein the signal source 11 is shown connected through capacitance 20 and a switch indicated generally by numeral 21 to the grids of a paralleled pair of electron tubes 22, 23. Tubes 22 and 23 are connected in a cathode follower circuit to provide low impedance charging of capacitance 24 which is connected to the tube cathodes via a unilateral impedance device 25. This circuitry thus provides for the charging of capacitance 24 during each positive pulse produced by signal source 11.

Discharge of capacitance 24 during the intervals between input pulses is accomplished by a constant current path in the form of the pentode electron tube 26 the anode of which is connected to the ungrounded terminal of capacitance 24. The discharge rate of capacitance 24 is determined by the anode impedance of tube 26 which controls the grid potential of tube 26 and automatically by variation of the potential of the cathode of tube 26 by signals from control circuit 19 (Fig. 6).

The anode of tube 26 is connected through a cathode follower circuit including tube 28 and a capacitance 29 to the grid of an output cathode follower circuit of tube 30 (element 16 of Fig. 1). Thus basically and without the further action of the additional tubes 31 and 32, a sawtooth waveform would be realized at the cathode of tube 30. The operation of tube 32 in conjunction with clamper tube 31 and capacitance 29 changes this situation. Tube 32 is normally held nonconductive by virtue of a low voltage maintained at the grid thereof, however the sampling pulse generator 14, shown in detail in Fig. 3 is arranged to provide a very short duration positive pulse at the end of each positive pulse from signal source 11. During this brief instant tube 32 conducts to discharge capacitance 29 so that the succeeding sawtooth signal does not reach the grid of tube 30. During the production of the sawtooth, the charge developed upon capacitance 29 as a result of conduction by tube 32 is dissipated through the clamper tube 31, the result being that the cathode of tube 31, the anode of tube 32 and the grid of tube 30 subsequently will be raised to a positive polarity relative to ground by the succeedent pulse from signal source 11. This polarity change is substantially equal in magnitude to the peak-to-peak amplitude of the sawtooth signal as is the positive polarity output pulse signal produced at the cathode of tube 30 in coincidence with each pulse from signal source 11.

The circuitry by which the short duration sampling pulse is produced is shown in typical detail in Fig. 3 of the drawing to which attention is now directed. The apparatus of Fig. 3 receives the pulses from signal source 11 via capacitance 33 which is connected to the grid of tube 34. Tube 34 is connected in a form of split load circuit, however for the purposes of the present discussion it is necessary to consider only the signal developed at the anode of tube 34 which is inverted relative to the input signal. This negative pulse signal is applied to the grid of tube 35 which together with tube 36 is connected in a form of fast-acting switch circuit wherein tube 35 is normally conductive and tube 36 cut-off. This condition is altered for the duration of each negative pulse produced at the anode of tube 34 during which period tube 36 is conductive to produce a flow of current through an inductance 37. Typically inductance 37 is selected to resonate with the distributed capacity of the associated circuitry at a frequency of approximately 5 megacycles per second. Upon cessation of conduction by tube 36, this resonant circuit is shocked into oscillation, however only the first positive half cycle appears in significant polarity due to the unilateral shunting device 38 which prevents the potential of the anode of tube 36 from rising above the potential of the supply voltage.

The anode of tube 36 is connected to the grid of tube 39 by a coupling circuit which includes capacitance 40 and a "clamper" unilateral impedance 41. The circuit of tube 39 is designed to provide amplification and inversion of the positive half-sinusoidal "pulse" from tube 36.

An inverted or negative polarity pulse of approximately 0.1 microsecond duration is thus produced at the anode of tube 39 immediately following the termination of each pulse from signal source 11. This pulse is not of uniform amplitude but is subject to variation with pulse repetition rate. In addition, this output of tube 39 contains small amplitude variations, the remnants of the damped oscillations produced at the anode of tube 36. Since uniformity in pulse amplitude is desired, this composite signal is delivered to a clipper tube which is biased in such manner as to selectively amplify only a restricted intermediate portion of the pulse signal.

Tube 42 is connected in a circuit wherein the anode load resistance is split into two portions 44 and 45 connected respectively to the anode and cathode. The cathode resistor of tube 42 is connected to a negative supply and by-passed to ground by a unilateral impedance element 46 polarized to conduct only when the cathode of tube 42 falls below ground potential. A characteristic of this circuit is that when element 46 is non-conductive, resistance 45 causes degeneration with resultant small amplification. On the other hand with element 46 conductive, the degenerative action of resistance 45 ceases and high amplification by tube 42 is possible. The overall operation of the circuit of tube 42 upon application of negative-going pulses is that of low amplification during a portion of the pulses near the base line, high amplification during an intermediate portion of the pulses, and zero amplification during larger amplitude portions of the pulses as the grid of the tube is driven below cut-off potential. To assist in this operation, a unilateral impedance element 47 is inserted in the grid circuit of tube 42 to operate as a clamper.

A positive pulse of substantially 0.1 microsecond duration and uniform amplitude is thus produced at the termination of each positive pulse produced by source 11. These pulses are applied to the grid of tube 32 (Fig. 2) of the sawtooth sampler 15 through a cathode follower circuit built around tube 48. The circuit of tube 48 includes a decoupling network of resistance 49 and capacitance 50 and a biasing and clamping arrangement including potentiometer 51 and unilateral impedance element 52 to assist in the maintenance of uniformity in sampling signals applied to the grid of tube 32.

Figure 5:
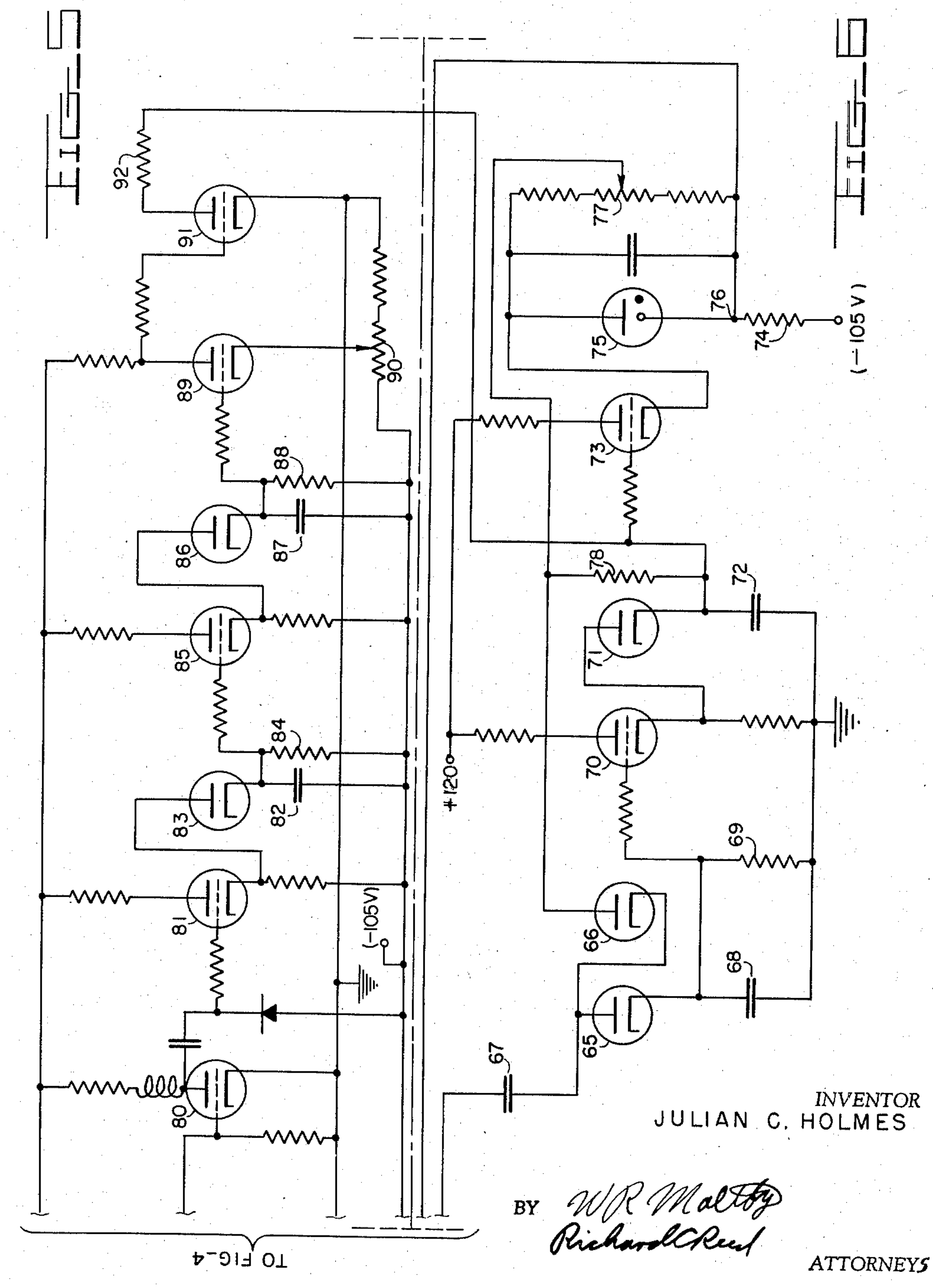

The system thus far described in detail is controlled to provide much wider range of operation by the additional detailed circuitry shown in Figs. 4, 5 and 6. These circuits sample the signal produced at the cathode of tube 30 (Fig. 4) to provide bias control of the condenser discharge tube 26 (Fig. 2).

Circuitry of Fig. 4 associated with tubes 55, 56, 57 and 58 is a multistage clipper-amplifier (identified in Fig.

1 by the reference number 16–A) having suitable frequency response to handle the pulse type signals involved which are typically of 0.4 microsecond duration. The signals applied to the first tube of the amplifier are taken from the anode of tube 30 which is arranged in a form of split load circuit (identified as 16 in Fig. 1). Since the cathode derived output pulse signals produced at the cathode of tube 30 are of positive polarity, the anode derived signals are of negative polarity and following amplification appear at the anode and cathode of the split loaded tube 58 as negative and positive pulses, respectively. Tube 55 operates basically to amplify and invert the waveform to provide a large amplitude positive pulse to the grid of tube 56. Tube 56 is biased below cut-off to function as a first clipper to remove any extraneous small signals which might be present thereby minimizing the effects of noise.

Because of the large amplification of the circuitry preceding tube 56, undesirably small signals may still be coupled to the plate of tube 56 even with the grid of tube 56 below cut-off because of the grid-anode capacitance within the tube. These small signals could be amplified by the succeedent tube 57 to have undesirable effects, hence a special coupling circuit is incorporated between these two tubes. This circuit includes the three unilateral impedance elements 59, 60 and 61. Element 59 operates to "clamp" the grid of tube 57 at ground potential. This condition minimizes the undesired positive polarity signals. Serially connected between tubes 56 and 57 is element 60 which is typically a crystal diode such as a type 1N39 having a high back impedance. Element 60 is connected into the circuit in such manner as to conduct only negative pulses to the grid of tube 57. In addition, the unilateral impedance element 61, cooperative with the voltage divider of resistances 62 and 63 maintains the juncture between elements 60 and 61 at an average potential which is approximately one volt positive relative to the potential of the grid of tube 57, effectively preventing even negative polarity pulses of amplitude less than one volt from reaching the grid of tube 57.

The anode of tube 57 is coupled to the grid of tube 58 which, as previously mentioned, is in a split load circuit capable of producing both negative and positive output signals in response to positive signals obtained from tube 57.

The large amplification produced by the circuit of tubes 30, 55, 56, 57 and 58 causes extreme sensitivity to power supply voltage variations and coupling through the power supply. Decoupling circuits are incorporated to minimize this difficulty. To assist in the maintenance of uniformity of operation over wide ratios of pulse duration to pulse spacing, unilateral impedance elements are employed in various grid circuits to minimize the effects of variations in the average D.-C. grid potentials.

The signals obtained from tube 58 (Fig. 4) are applied to two circuits, the separate outputs of which are combined by the circuitry of Figs. 5 and 6 to provide the control signal for the sawtooth generator discharge tube 26 of Fig. 2.

The first of these circuits is the control circuit 19 of Fig. 1 which is shown in detail in Fig. 6 of the drawing. This circuit receives the positive polarity pulses from the cathode of tube 58 and derives a D.-C. control potential in proportion to the amplitude of the pulses. To this end the pulses are applied to a pair of unilateral impedance elements 65 and 66 by way of capacitance 67. Element 65 is connected to ground through a time constant circuit including capacitance 68 and resistance 69 and is polarized in such manner as to effect a rapid charge of capacitance 68 during each positive pulse applied thereto. Discharge of the unbalanced voltage developed across capacitance 67 by the charging of capacitance 68 is provided by element 66. Such action improves the linearity of the relationship between the peak voltage developed across capacitance 68 and the peak voltage applied to element 65. The time constant of capacitance 68 and resistance 69 is typically 2500 microseconds and thus provides a relatively long duration discharge following each pulse. The net effect is a "stretched" pulse.

The grid of tube 70 is connected to capacitance 68. This tube is in a cathode follower circuit containing a unilateral impedance element 71 and a storage capacitance 72 and is arranged to provide low impedance charging of capacitance 72 to maintain thereacross substantially the peak amplitude of the positive pulses produced at the cathode of tube 58.

High impedance coupling of the voltage developed across capacitance 72 is provided by a cathode follower circuit including tube 73, to which end the grid of tube 73 is connected to capacitance 72. The cathode follower circuit of tube 73 includes resistance 74 as the basic load resistance, however a constant voltage drop device or D.-C. coupling network such as a voltage regulator tube 75 is also incorporated to assist in the maintenance of desired potential conditions across resistance 74. It is the voltage thus developed at the juncture of tube 75 and resistance 74, point 76, that is applied to the cathode of tube 26 to effect a variation in the discharge path of capacitance 24 to vary the effective constant current discharge rate to maintain uniformity in the peak amplitude of the generated sawtooth signal regardless of the average time spacing of pulses produced by signal source 11.

The potentiometer 77 placed in the circuit across voltage regulator tube 75 effectively varies the zero signal potential across capacitance 68 and as a result, operating through tube 70, element 71 and tube 73, determines the zero signal current through voltage regulator tube 75 and the zero signal potential of point 76.

The circuitry thus far described provides low impedance charging of capacitance 72, however aside from a large resistance 78 (of typically 80 megohms) which is connected to the grid of tube 73 and to potentiometer 77 in a constant current arrangement, a charge placed on capacitance 72 would remain indefinitely making correction for a decreasing sawtooth amplitude impossible. The discharge of capacitance 72 is provided by the threshold sensitive circuit of Fig. 5 which is synchronized by the pulses from the anode of tube 58 to permit discharge of capacitance 72 when appropriate.

The grid of tube 80 in the circuit of Fig. 5 is coupled to the anode of tube 58 of Fig. 4. Tube 80 is normally conductive, however negative input pulses reduce conduction in tube 80 or even cut the tube off entirely producing positive pulses at the anode of tube 80. The anode of tube 80 is coupled to the grid of tube 81 which is arranged in a cathode follower circuit designed to effect low impedance charging of a capacitance 82 through a unilateral impedance element 83. Capacitance 82 is typically of 250 micro-micro-farad capacity and is shunted by a resistance 84 typically of 10 megohms which forms a circuit whose time constant is significantly longer than the duration of the negative pulses obtained from tube 58. This circuit thus produces a "pulse stretching" effect.

Signals produced across capacitance 82 are applied through a second cathode follower circuit including tube 85 and a unilateral impedance element 86 to a second time constant circuit including capacitance 87 and resistance 88 to provide additional "pulse stretching" action. The time constant of this circuit is typically of the order of 2.5 seconds. The voltage developed across capacitance 87 is substantially of a D.-C. nature during periods of development of negative pulse signal at the anode of tube 58, the average level in a positive sense being proportional to the peak negative amplitude of the signals produced at tube 58. This positive voltage is subject to long exponential decay upon cessation of the repetitive signals at tube 58 or a mere reduction in the amplitude of such signals. On the other hand, a rapid build-up in this voltage is possible through the cascaded cathode follower circuits in the event of increases in amplitude of signals at the anode of tube 58.

The voltage developed across capacitance 87 is applied to the grid of a level selector stage including the variably biased tube 89. The bias on tube 89 is controlled by a potentiometer 90 disposed in the cathode thereof which is adjusted to maintain the anode potential of tube 89 at approximately ground potential in the absence of signals from signal source 11. It follows then that the application of signals from source 11 will produce a decrease in the potential of the anode of tube 89.

The anode of tube 89 is directly connected to the grid of threshold tube 91. Tube 91 has its cathode grounded and is thus capable of anode conductivity when the anode of tube 89 is near ground as during the absence of signals from signal source 11, however it can be rendered nonconductive by the negative potentials developed at the anode of tube 89 upon application of sufficiently large signals from signal source 11.

The anode of tube 91 is connected through resistance 92 to the cathode of tube 71 of Fig. 6 to provide a controllable discharge path for capacitance 72.

With the combined apparatus of Figs. 5 and 6, it is thus apparent that capacitance 72 will be charged to a high positive potential through tubes 70 and 71 whenever the sawtooth voltage developed across capacitance 24 (Fig. 2) becomes excessively large as a result of the presentation by tube 26 of an excessively small capacitance discharge resistance. The resulting stretched signal, applied through tube 73 to the cathode of tube 26 increases the discharge resistance thereof to reduce the amplitude of the sawtooth signal. On the other hand, whenever the sawtooth voltage developed across capacitance 24 is small as a result of the presentation by tube 26 of an excessively large capacitance discharge resistance or even the absence of signal source 11, the discharge of capacitance 87 soon produces conduction by tube 91 to discharge, through resistance 92, capacitance 72, lowering the potential at the cathode of tube 71 to decrease the discharge resistance shunted across capacitance 24 by tube 26 and increase the amplitude of the sawtooth signal or to place the overall circuit in optimum condition for rapid self-adjustment to the average frequency of signals to be subsequently applied from signal source 11.

Although operation of the basic system has been described in connection with an input pulse type waveform employing pulses of uniform duration which are modulated in repetition rate or time spacing to convey intelligence, other forms of modulation are possible for example, pulses of fixed recurrence rate and variable duration may be encountered. Since it is an object of the invention to provide a system having wide utility, components are incorporated to permit operation with signals of such type. The basic difference between operation as first described and the modified operation is that of the polarity of the unit functions defining the beginning and the end of the variable duration time period. Thus relatively simple circuitry associated with signal polarity selection in the initial stages of the overall circuit is adequate. To this end, an initial modification is shown in Fig. 3 in the coupling circuitry between tubes 34 and 35 wherein by the operation of switch 100 to the lower position, the grid of tube 35 is coupled to the cathode of tube 34 via a delay line 101 to receive signals of opposite polarity than those of the original condition at the beginning and end of each pulse. The net result is that tube 36 produces a positive polarity pulse of 0.1 microsecond duration about 0.4 microsecond after the termination of the pulse from signal source 11. Thus the 0.4 microsecond delay produced by the delay line produces at the cathode of tube 30 (Fig. 4), pulses of constant 0.4 microsecond width. The amplitude of this signal varies directly with the duration of that from signal source 11.

A second switching required when operating with duration-modulated pulses is in Fig. 2 in the input signal circuit to tube 22 where polarity selection is provided by an appropriately polarized unilateral impedance element 93 connected in the circuit in the lower position of the contacts of the switch 21. To assist in this action, element 93 is provided with a D.-C. biasing voltage obtained from a voltage divider of resistances 94 and 95 connected to the positive supply source.

The apparatus thus described, although it is necessarily complex to maintain uniformity of operation with input signals of widely differing characteristics, is capable of providing a degree of signal conversion not possible with prior circuits.

Obviously many modifications and variations of the present invention are possible in the light of the above teachings. It is therefore to be understood that within the scope of the appended claims the invention may be practiced otherwise than as specifically described.

What is claimed is:

1. A signal conversion device comprising, means generating pulse-time modulated impulses, an energy storage device, means for charging said energy storage device to a selected level in response to each impulse, means for discharging said energy storage device at a selected rate in each interval between impulses, means deriving a control signal in dependency on the amplitude of discharge of said energy storage device, said last named means including threshold sensitive means for producing a higher rate of decay of the control signal when the amplitude of discharge of said energy storage device falls below a selected threshold value than exists when the amplitude of discharge exceeds the selected threshold value and discharge amplitude control means responsive to said control signal for maintaining a selected average amplitude of discharge of said energy storage device.

2. A signal conversion device comprising, means generating pulse-time modulated impulses, a condenser, means charging said condenser to a preselected energy level in response to each impulse, a discharge path for said condenser operative to discharge said condenser to a level in dependency on the time spacing between successive impulses, means deriving control signals in dependency on the average amplitude of the condenser discharge, said last named means including threshold sensitive means for producing a higher rate of decay of the control signal when the amplitude of discharge of said energy storage device falls below a selected threshold value than exists when the amplitude of discharge exceeds the selected threshold value, and means for varying the impedance of said discharge path in accordance with said control signals, whereby the average magnitude of the condenser discharge is held substantially constant.

3. A signal conversion device comprising, means generating pulse-time modulated impulses, an energy storage device, means for charging said energy storage device to a selected level in response to each impulse, means for discharging said energy storage device at a selected rate in each interval between impulses, means deriving a control signal in dependency on the amplitude of discharge of said energy storage device, said last named means including threshold sensitive means for producing a higher rate of decay of the control signal when the amplitude of discharge of said energy storage device falls below a selected threshold value than exists when the amplitude of discharge exceeds the selected threshold value, discharge amplitude control means responsive to said control signal for maintaining a selected average amplitude of discharge of said energy storage device, and amplitude sensing means deriving an output pulse signal of uniform duration in dependency on the amplitude of each discharge of said energy storage device.

4. A signal conversion device comprising, means generating pulse-time modulated impulses, an energy storage device, means for charging said energy storage device to a selected level in response to each impulse, means for discharging said energy storage device at a selected rate in each interval between impulses, means deriving a control signal in dependency on the amplitude of discharge of said energy storage device, said last named means including threshold sensitive means for producing a higher rate of decay of the control signal when the amplitude of discharge of said energy storage device falls below a selected threshold value than exists when the amplitude of discharge exceeds the selected threshold value, discharge amplitude control means responsive to said control signal for maintaining a selected average amplitude of discharge of said energy storage device, means for producing a sampling pulse of uniform duration and amplitude at the conclusion of each interval between impulses, and sampling means responsive to the sampling pulse to produce an output signal in dependency on the amplitude of discharge of the energy storage device during the preceding interval between impulses.

5. A signal conversion device comprising, means generating pulse-time modulated impulses, a capacitance, means for charging said capacitance to a selected voltage in response to each impulse, a constant current path for substantially linearly partially discharging said capacitance in each interval between impulses, means deriving a control signal in dependency on the average amplitude of discharge of said energy storage device, said last named means including threshold sensitive means for producing a higher rate of decay of the control signal when the amplitude of discharge of said energy storage device falls below a selected threshold value than exists when the amplitude of discharge exceeds the selected threshold value, means for varying the impedance of said constant current path in dependency on said control signal, means for producing a sampling pulse of uniform duration and amplitude at the conclusion of each interval between impulses, and sampling means responsive to the sampling pulse to produce an output signal in dependency on the amplitude of discharge of the energy storage device during the preceding interval between impulses.

References Cited in the file of this patent

UNITED STATES PATENTS

| | | |
|---|---|---|
| 2,448,069 | Ames et al. | Aug. 31, 1948 |
| 2,500,536 | Goldberg | Mar. 14, 1950 |